Jan. 13, 1970  H. F. McKINLEY  3,489,883

PROPORTIONAL HEAT CONTROLLER

Filed June 21, 1968

HORACE F. McKINLEY
INVENTOR.

BY Roy H. Smith, Jr.
ATTORNEY

United States Patent Office 3,489,883
Patented Jan. 13, 1970

3,489,883
PROPORTIONAL HEAT CONTROLLER
Horace F. McKinley, Houston, Tex.
(4615 Holly St., Bellaire, Tex. 77401)
Filed June 21, 1968, Ser. No. 739,033
Int. Cl. H05b 1/02
U.S. Cl. 219—505        9 Claims

ABSTRACT OF THE DISCLOSURE

Starts with a heat controller circuit utilizing a full wave bridge power supply, a silicon controlled rectifier in series with an electrically resistive load across the bridge, a Zener diode regulator in series with a resistor across the bridge, a unijunction transistor in series with a pair of resistors across the Zener regulator, and a capacitor connected between the emitter of the UJT and the grounded UJT resistor so that the capacitor discharges through the UJT and resistor, which is connected across the gate and cathode of the SCR, to furnish the gating pulses which fire the SCR. Adds a capacitor charging circuit from the capacitor-UJT junction through another resistor, the collector-emitter part of a PNP transistor and another resistor to the high voltage side of the Zener regulator. Also adds across the Zener regulator a voltage divider network connected at its midpoint to the base of the PNP transistor, the upper part consisting of a sensor (thermistor) in parallel with a calibrating resistor. The lower part of the voltage divider network comprises a set point control, a second Zener regulator and a Sensistor. The Sensistor has been found to compensate for changes in the voltage of the first mentioned Zener regulator resulting from changes in ambient temperature, as the same temperature variations cause the voltage drop across the Sensistor to change in the same manner as the Zener voltage. This effect is enhanced, and also used to compensate for line voltage fluctuations, by a thermal clip linking the Sensistor and the Zener regulator.

---

Figure 1:
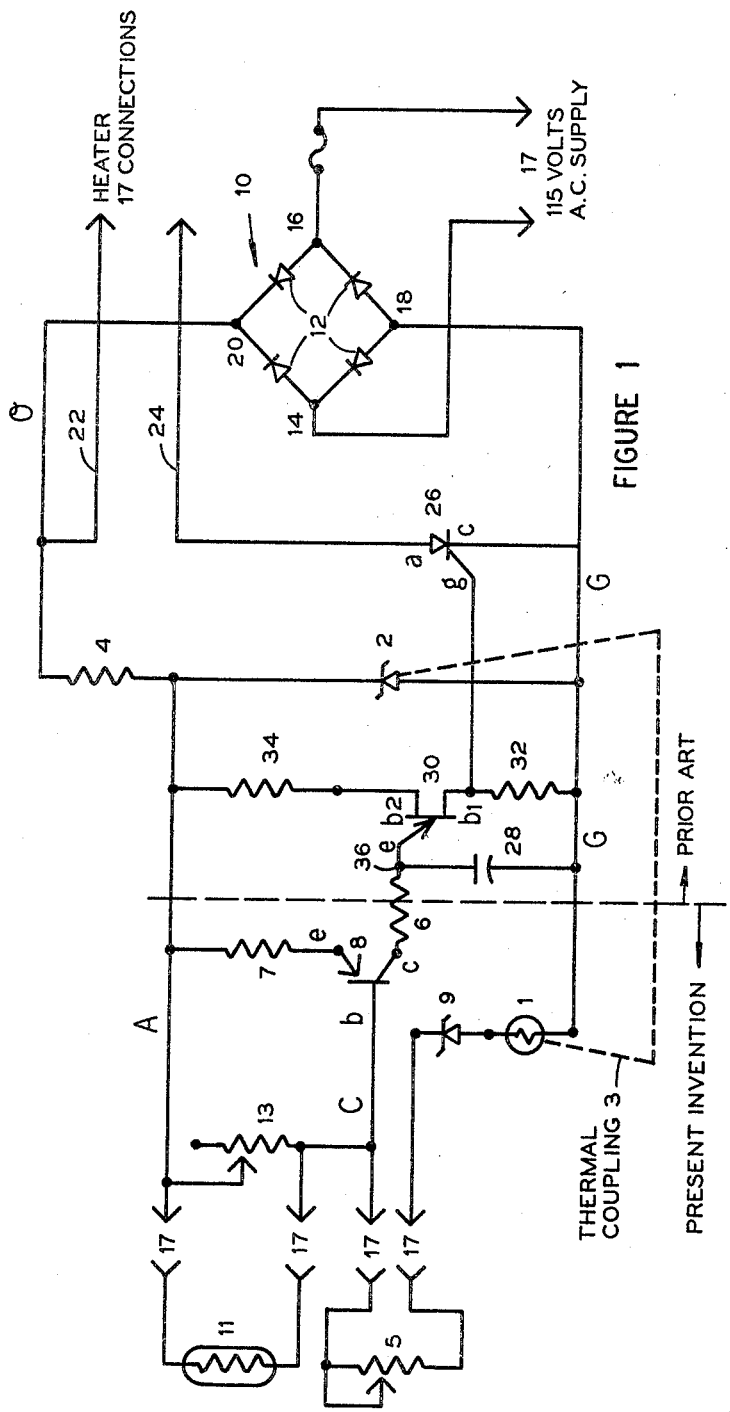

This invention relates to an electronic temperature controlling circuit that may be incorporated in any system, process, instrument, machine, or the like, that employs resistive type heating elements such as Nichrome wire and where specific temperatures required by those systems, processes, machines, or the like must be accurately and economically maintained to accomplish the purpose for which they were designed. More specifically, this invention relates to a proportional type of temperature controlling circuit which supplies only the amount of power to the heating element that is needed to maintain that temperature at a desired level. This desired level of temperature will hereinafter be called the "set point."

To those familiar with the art of temperature control it is well known that, in order to hold an actual temperature at a set point, many things must be taken into consideration other than the temperature controlling circuit itself. Some of these factors are the location and power rating of the heating element; the nature of the medium that is being heated, in particular its heat transfer characteristics; the extent to which the heated work is insulated against loss of heat, and the way each of these interacts with and affects the other. The location of the temperature sensing element in a system or process is another factor to be considered. The electrical characteristics of the sensing element, such as its sensitivity and linearity, must also be considered, because these factors will determine the complexity of the temperature controlling circuit. The more complex this circuitry is, the less reliable and more expensive it can become.

It is an object of the present invention to provide a new and improved temperature controlling circuit which is simple, reliable, and economical.

Another object of this invention is to provide a means to sense the temperature of a heated element or system and control this temperature at a set point by limiting the average power supplied to the heater to a rate such that the heater will deliver only enough heat to maintain that set point.

Still another object of this invention is to provide an improved temperature controlling circuit whose performance is not affected by normal and foreseeable changes in ambient temperature or line voltage fluctuations.

A further object of this invention is to make possible a novel temperature controlling circuit whose temperature set point can be operator adjusted to any temperature desired over a broad range of temperatures, and without having to change sensors or otherwise modify the circuit. It is this feature that allows one temperature controlling circuit to cover many applications and still employ the same component parts.

The applicant makes no pretense to having pioneered the invention of all proportional heat controllers, or even to having pioneered all such heat controllers using solid state electronic circuit elements. A basic part of his overall controller circuit is old in the art, and thus it is admittedly old to supply the heating load with rectified alternating current through a silicon controlled rectifier triggered by a capacitor which is discharged through a unijunction transistor, the discharge pulses being applied to the gate of the silicon controlled rectifier (hereinafter SCR) to permit the flow of large currents through the SCR over a controlled portion of each half cycle of the rectified alternating current. It is also old to regulate the voltage supplied to the unijunction transistor (hereinafter UJT), the capacitor and other circuit elements by connecting these elements in parallel with a Zener diode regulator which is connected to the rectified A.C. source for reverse current flow in series with a resistor, thus taking advantage of the fact that the voltage drop over an operating Zener regulator is essentially constant over a very wide range of currents.

What the inventor has done that is believed to be new, useful, and inventive, is to modify the charging circuit for the condenser and the voltage divider network that controls the current flow through the charging circuit in such manner as to provide better control of the frequency with which the condenser is charged and discharged and one that has greater stability in the face of fluctuations in both the temperature of the atmosphere surrounding the circuit elements and the line voltage supplying them. The complete charging circuit, connected in parallel with the Zener regulator, consists of the condenser having one end connected to a common ground and the other to a first resistor (this junction also being connected to the emitter of the UJT), through such first resistor to the collector of a PNP transistor, and out through the emitter terminal of such transistor through a second resistor to the high voltage side of the Zener regulator. The voltage divider network, on the other hand, also consists of a series network connected in parallel with the Zener regulator. In the series are a Sensistor, a second Zener diode, also connected for reverse current flow, a "set point control" in the form of a variable resistor or potentiometer and a thermistor or similar sensor located adjacent the system being heated to sense its temperature. A "trimming" resistor is connected in parallel with the thermistor to allow temperature range and to "linearize" the thermistor.

These two circuits or sub-circuits, the capacitor charging circuit and the voltage divider network, are not only connected in parallel at their ends but are also interconnecting the junction of the variable resistor and the sensor to the base of the PNP transistor. This connection insures that the voltage developed across the thermistor sensor as a result of its thermal contact with the load will be applied across the series combination of the transistor (base-to-emitter) and the emitter resistor of the charging circuit. Since a thermistor has as its distinguishing characteristic a decrease in resistance as its temperature increases, an overshoot in load temperature will cause a reapportionment of the total voltage across the voltage divider network such that the voltage across the sensor and applied between the base and emitter terminals of the PNP transistor will decrease. The effect on the transistor is to increase its resistance and cause it to conduct less than previously, thus decreasing the charging rate of the condenser and causing it to charge and discharge less often per unit of time (it discharges as soon as charged, but must wait until charged to the "peak point voltage" of the UJT before discharge is possible), the UJT will send out gating pulses to the SCR at a slower rate, decreasing the portion of each half cycle during which current flows through the SCR to the load, thereby lowering the electrical heat supplied to the load and thus decreasing its temperature.

The Sensistor, as opposed to the thermistor, is located out of thermal contact with the load and has the opposite type of thermal resistivity, that in which its resistance increases rapidly as its temperature increases. The present inventor has added the Sensistor to the voltage divider network to compensate for changes in ambient temperature which can cause small but significant changes in the breakdown voltage of the Zener regulator, which to some extent is temperature dependent. An increase in the Zener voltage, for instance, would cause increased conduction of the PNP transistor and thus would speed up the charging and discharging of the condenser, causing more power to be supplied to the load and increasing its temperature. Since the rise in ambient temperature which raised the temperature of the Zener regulator and thus increased its Zener voltage also causes an increase in the temperature of the Sensistor which increases its resistance, the Sensistor will absorb all or most of the increment in voltage supplied by the Zener regulator to the voltage divider network, thus maintaining the conduction through the PNP transistor at essentially the same level as before the change. The PNP transistor is also somewhat temperature dependent, so that it will conduct more upon an increase in ambient temperature. The Sensistor helps compensate for this effect also.

The present inventor has also discovered that the compensating effect of the Sensistor for ambient temperature changes can be enhanced, and can also be used to counteract supply voltage fluctuations, by coupling the Sensistor thermally to the Zener regulator (diode). Any coupling whereby a portion of the heat dissipated by the Zener regulator flows to the Sensistor may be utilized effectively, one preferred form being a metal clip attached to the cases of both elements, which are located adjacent one another but are not linked to one another electrically except by their connections to a common ground.

Figure 4:
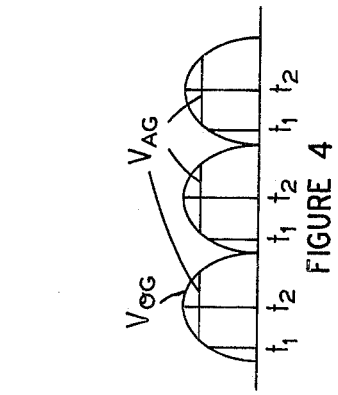
Figure 2:
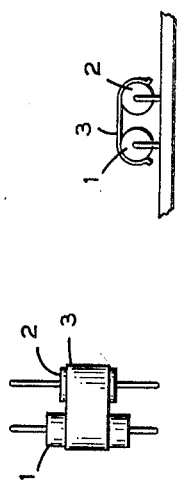
Figure 3:
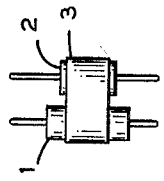

The nature of the present invention will perhaps be more readily understood by reference to the attached drawing, in which:

FIGURE 1 is a complete schematic drawing of applicant's proportional temperature controller, the schematic being marked with a light dashed vertical line to separate that which is known to be old in the art from the present invention (right and left, respectively), FIGURE 2 is a plan view of the Zener diode regulator and Sensistor with the thermal transfer clip in place, FIGURE 3 is an end view of the Zener regulator, Sensistor and clip of FIGURE 2, and FIGURE 4 is a graphical display of certain voltage versus time relationships in the circuit.

In the complete circuit schematic of FIGURE 1, reference character 10 indicates a full-wave bridge made up of the four diodes 12 connected in the usual manner shown to define the pair of diagonally opposed junctions 14 and 16 for line connections to an alternating current (AC) source of electrical power and the pair of diagonally opposed junctions 18 and 20 serving as input terminals for the control circuit and being connected thereto through ground lead G and the high voltage lead O, respectively.

The electrical heater load is connected between leads O and G by a pair of heavy duty leads 22 and 24, with a silicon controlled rectifier (SCR) or equivalent solid state switch 26 interposed between ground lead G and the load. If this were the complete circuit, no power would flow to the heater because the SCR would not conduct, even though the full rectified voltage ($V_{OG}$, FIGURE 4) appeared between its anode $a$ and its cathode $c$. To make the SCR conduct, a gating or triggering pulse of voltage must be impressed between the gate terminal $g$ and cathode terminal $c$, with the gate being positive with respect to the cathode. Such pulse need be of only short duration, a matter of microseconds compared with the millisecond period of the supply voltage between anode and cathode, and the peak voltage of the pulse need be only of the same order of magnitude as supply voltage or smaller, depending on the particular SCR selected.

Such pulse is provided by the capacitor discharge circuit which includes capacitor 28, the unijunction transistor (UJT) 30 and resistor 32. (A transformer may alternately be substituted for resistor 32 to couple the capacitor to the UJT.) When the capacitor is not discharging, there is very little flow through the UJT 30, none at all through the emitter $e$ to either base and only an insignificantly small current from base $b_2$ to base $b_1$. (The resistors 32 and 34 respectively connecting bases $b_1$ and $b_2$ across the Zener regulator serve to fix the peak point voltage at a predetermined value.) However, as the capacitor is charged by another circuit or sub-circuit to be described below, it reaches a critical value known as the "peak point voltage" of UJT 30.

When the peak point voltage is impressed between terminals $e$ and $b_1$ of the UJT, it conducts internally between such emitter and base, permitting capacitor 28 to discharge through the UJT and resistor 32, and the resulting voltage drop across resistor 32 (over the transformer if the resistor is omitted) is also impressed over terminals $g$ and $c$ of SCR 26 to provide the aforementioned gating pulse which causes the SCR to conduct between its anode and cathode, thus supplying power to the load. While there may be several such pulses supplied to the SCR during each half-cycle of anode-to-cathode voltage $V_{OG}$, only the first gating pulse delivered in each half-cycle is of any significance because once the SCR starts conducting it will continue to conduct until it anode-to-cathode voltage falls to zero or nearly zero. At the end of each half-cycle, the fact that the impressed voltage does decrease to zero causes the SCR to stop conducting, and it remains in such state until again triggered by a gating pulse from the capacitor discharge circuit.

It will be evident that the amount of power supplied to the load depends on the phase relationship between the supply voltage $V_{OG}$ and the frequency at which the capacitor 28 is discharged through UJT 30. If the frequency of discharge is such that the SCR 26 is "turned on" by gating pulses early in each half-cycle of supply voltage $V_{OG}$, e.g., at time $t_1$ indicated in FIGURE 4, there will be current and power flowing to the load during the remaining portion of each half-cycle, and thus near maximum power is being delivered. On the other hand, if the first gating pulse is not delivered until the voltage $V_{OG}$ is at a maximum, at times $t_2$ shown in FIGURE 4, power will be delivered to the load only for half of the time possible, and thus the power and energy actually used will be only half of the possible maximum. Similarly, power may be delivered over any portion of each half-cycle, making possible an infinitely variable range of load temperatures.

Since the frequency of discharge of capacitor 28 depends in turn on the frequency with which it is charged and the time required in each charging cycle to reach the peak point voltage of UJT 30, it will be apparent that the capacitor charging circuitry affords considerable opportunity to control the power delivered to the load and thus to control the temperature maintained in the work by the electrical heater which constitutes the load. Before discussing the charging circuit, however, some mention must be made of Zener diode 2, used herein, as in the prior art, as a voltage regulator.

The Zener regulator 2 is connected in series with a resistor 4 having as its function absorbing the portion of the supply voltage $V_{OG}$ in excess of the "Zener voltage" of the Zener regulator 2. The Zener voltage is that at which a Zener diode will conduct in a direction reverse from normal (the reverse state being shown in FIGURE 1) and will thereafter conduct in such reverse direction with almost no change in the voltage drop over it regardless of fluctuations in the current flowing through it. The effect is to "clip" the tops from the half-cycles of the supply voltage $V_{OG}$, as indicated by the flat-topped peaks labeled $V_{OG}$ in FIGURE 4. This is the voltage applied to all of the control circuitry connected in parallel with the Zener regulator 2, illustrated in FIGURE 1 as leads or busses A and G. It is practically a D.C. voltage with little fluctuation, but it is important to note that such regulated voltage $V_{AG}$ nevertheless regularly dips to zero with the same frequency as the supply voltage $V_{OG}$ applied to the silicon controlled rectifier (SCR) 26.

Returning to the charging circuit for capacitor 28, such circuit or sub-circuit is in parallel with Zener regulator 2, between leads or points A and G. It consists of capacitor 28 connected to ground lead G at one side and to resistor 6 at the other, the latter connection being at the junction 36 of the capacitor 28 and the emitter terminal $e$ of the unijunction transistor (UJT) 30, through resistor 6 to the collector electrode of a PNP transistor 8, through the transistor and out from its emitter electrode $e$, and finally through resistor 7 to the high voltage lead A. The PNP transistor conducts to some extent at all times, and if there were no further circuitry the fixed nature of the series charging circuit elements 28, 6, 8 and 7 would fix the charging time and frequency and of capacitor 28 (with some variation caused by fluctuations in supply voltage and ambient temperature). To provide control over such charging time and frequency, it is necessary to add circuit elements in parallel with the enumerated elements of the charging circuit, so that the effective resistance of the charging circuit can be varied.

According to the present invention, such enumerated elements are connected together in a voltage divider network connected in parallel with the described charging subcircuit and having a midpoint C connected to the charging subcircuit at the base $b$ of the PNP transistor 8. The lower half of this network consists of a Sensistor 1, a Zener diode 9 and a variable resistor or potentiometer 5 used as the set point control, connected in series as shown in FIGURE 1. The upper half of the voltage divider network, above midpoint C, consists of a thermistor 11 and a resistor 13 shown as variable or adjustable in resistance, these two elements being connected in parallel with each other and the base-to-emitter portion of PNP transistor 8 and its emitter resistor 7. Resistor 13 is shown variable only because it must sometimes be varied for the particular thermistor 11 used in a given application, i.e., it must be calibrated with the thermistor. A thermistor has a decidedly nonlinear relationship between resistance and temperature, and resistor 13 is adjusted to make the resistance of the combination as nearly linear as possible. Thereafter it is not adjusted, leaving potentiometer 5 as the only control member to be adjusted by the operator.

The elements 17 simply indicate jack connections between external elements and those internal elements which are mounted on a printed circuit board. Thus thermistor 11 is external because it is located in thermal contact with the work whose temperature is being controlled, and potentiometer or set point control 5 is external because it is mounted on a control panel within convenient reach of the operator. Similarly, there are jack connections for the A.C. supply leads and leads from the proportional controller to the heater load. The printed circuit board containing the bulk of the control circuit elements may be mounted wherever convenient and fairly accessible.

OPERATION

Assuming the circuit to have been operating and controlling the load temperature at a value $T_1$, the operator now determines to raise such temperature to a value $T_2$. To do this he adjusts set point control 5 to decrease its resistance, thus redividing the distribution of the approximately constant Zener voltage $V_{AG}$ so that the voltage drop across thermistor 11 and the combination of emitter resistance 7 and PNP transistor 8 (emitter-to-base) is increased. This causes increased conduction through transistor 8 from the emitter to the collector (in effect lowering the internal resistance between such electrodes), decreasing the time required by condenser 28 to charge to the peak point voltage, or in other words increasing the frequency with which the condenser is charged and discharged. With such increase, the gating pulses from UJT 30 to SCR also increase in frequency, turning on the SCR earlier in each half-cycle of supply voltage $V_{OG}$ and thus causing more power to be delivered to the heater load to increase its temperature.

Should the temperature actually obtained as a result of this adjustment tend to exceed that indicated by the new setting of set point control 5, the thermistor 11 automatically corrects for the overshoot. Since thermistor 11 will decrease in resistance in proportion to the excess temperature, it will lower the voltage between points A and C in a like proportion, causing a decrease in the current flowing through the PNP transistor 8 and thus somewhat decreasing the charging-discharging frequency of the capacitor to fire or turn on the silicon controlled rectifier 26 a little later in each half-cycle, thus cutting down slightly on the power delivered to the load and bringing the temperature down to $T_2$, as indicated by the second position of set point control 5. A similar but opposite chain of events occurs in increasing the resistance of set point control 5 to decrease the load temperature to a lower value $T_3$.

The role of Sensistor 1 in the voltage divider network is to compensate for slight variations in the Zener voltage of the Zener regulator 2. Although as previously stated such Zener voltage is practically constant regardless of the current through this element 2, no circuit element is perfect and there will be some variation in the voltage $V_{AG}$ with changes in ambient temperature, fluctuations in line voltage, or both.

Sensistor 1 counteracts the effects of such small changes in the Zener voltage by virtue of the fact that the resistance of a Sensistor increases quite sensitively with an increase in the temperature of the air or other medium surrounding it, the temperature of the Sensistor rapidly adjusting to that of the ambient and its resistance increasing or decreasing in like manner.

When a rise in ambient temperature causes an increase in the Zener voltage $A_{AG}$, the resulting increase in voltage across the voltage divider network is balanced by an increase in the temperature of Sensistor 1. The effect is to increase the resistance of Sensistor 1, causing most of the voltage increase in $V_{AG}$ to be manifest as an increase in voltage between points A and C, which would cause increased conduction through the PNP transistor and a higher charge-discharge frequency of condenser 28 to deliver more power to the load and increase its temperature when no such increase is desired. In other words, the Sensistor acts to compensate for undesired thermally-induced fluctuations in the Zener voltage by absorbing the increase or decrease in such voltage.

This effect and the similar effect in counterbalancing supply voltage changes have been enhanced by a direct mechanical or thermal connection between Zener regular 2 and sensitizer 1, as indicated schematically by dashed line 3 in the circuit diagram. One preferred form of such coupling or connection 3 is illustrated in FIGURES 2 and 3, this embodiment being in the form of a metal clip or strap which partially surrounds each element 1 and 2 and bridges the space between them. It is possible to increase the rate of heat transfer between the two elements by mounting them even closer than as illustrated, so that their cases actually touch, and also by increasing the cross section of the metal serving as the heat transfer medium. In practice, a piece of 28 gauge copper sheet metal and $\frac{5}{16}$ inch wide was found to be adequate to attain the desired stabilization.

It may be mentioned that the Zener diode 9 in the lower part of the voltage divider network is also used for its reverse flow characteristic of a constant voltage drop regardless of the magnitude of the current through it. In the voltage divider network it has the effect of increasing the range and sensitivity of the set point control 5. With the Zener diode 9 connected in the circuit as shown a change in the resistance of the set point control 5 causes a smaller and more predictable change in load temperature than would result if the Zener diode 9 were omitted altogether, or were replaced with an ordinary resistor.

EXAMPLE

In an embodiment actually built and tested with a heater having a capacity at 350 watts the circuit elements illustrated were as follows:

Diodes 12 of bridge—Motorola Part MDA 970-3, rated at 4 amperes and 200 peak inverse volts.

SCR 26—Part 2N3228, manufactured by Radio Corporation of America and rated at 200 max. volts anode to cathode, fired by a gate voltage of 10 volts and average current of 3.2 amperes.

Resistor 4—5000 ohms, 5 watts power dissipation capacity.

Zener regulator 2—Part 1N3027B, manufactured by Motorola or Central Lab. and having a zener voltage of 20 volts, power rating 1 watt.

Resistor 34—332 ohms, ½ watt power rating.

Resistor 32—47.5 ohms, ½ watt power rating.

UJT 30—2N4891, manufactured by Texas Instruments Company, emitter to base—2 ratings of 30 volts and 50 milliamperes, operated at an interbase valtage of 0.8 volt, for which the peak point voltage is 0.7 volt.

Capacitor 28—A Mylar foil condenser manufactured by Trinity Capacitor Company, 0.1 mf. capacity, 5% tolerance, 200 volts.

Resistor 6—1000 ohms, ½ watt power rating. (This resistor can be varied from 1K to 25K ohms to serve as a fine adjustment for the set point).

Resistor 7—47.5 ohms, ½ watt power rating.

PNP transistor 8—2N3703, manufactured by Texas Instruments Company, having ratings from collector to base of 50 volts, collector to emitter of 30 volts and operated at an emitter to base voltage of 0.05 to 0.5 volt.

Sensistor 1—330 ohms at 25° C., No. TM—¼ of Texas Instruments Company, ¼ watt.

Zener diode 9—1N3024B, manufactured by Central Lab. or Texas Instruments Company, having a Zener voltage of 24 volts, 1 watt rating.

Set point control or pot 5—Zero to 10K ohms, CB—1031 of Ohmite Mfg. Co., power rating 2 watts, counter-clockwise logarithmic taper.

Resistor 13—Zero to 2000 ohms set at 1500 ohms in operation, ½ watt power rating.

Thermistor 11—T-43A11, manufactured by Victory Engineering Company having a rating of 30,000 ohms at 25° C.

A temperature controller using the above described elements was used to control the temperature of a workpiece at temperatures in the range of 100° F. to 500° F. By the use of the Sensistor of the described circuit without the clip coupling it thermally to the Zener diode, the temperature of the work was maintained at various values throughout such range within accuracy of ±2° F. of the set point. When the described thermal coupling to the Zener regulator was added, the accuracy of the actual temperature was increased to ±.5° F. of the setting called for by the set point control.

What is claimed is:

1. In a proportional temperature controller of the type wherein a rectified AC voltage is impressed on an electrically resistive load through a silicon controlled rectifier (SCR) and such SCR is periodically triggered by the discharge of a capacitor through a first resistor and the emitter to base-one portion of a unijunction transistor (UJT) which is connected with its pair of bases in parallel with a first Zener regulator with said first resistor interposed between base-one and the ground terminal of the first Zener regulator and a second resistor interposed between base-two and the high voltage terminal of the first Zener regulator, said first Zener regulator being connected in series with a third resistor across said rectified AC voltage, such capacitor also being connected in a charging subcircuit in parallel with said first Zener regulator which includes at least a fourth resistor and the emitter to collector portion of a PNP transistor, and there also being a voltage divider network which includes a thermistor in parallel with said first Zener regulator, said thermistor being thermally coupled to the work being heated by said resistive load and said voltage divider network being connected to the base terminal of the PNP transistor at a point such that the thermistor is connected between said base terminal and the high voltage side of the Zener regulator, and in which one of said charging subcircuit and voltage divider network includes a potentiometer used as a set point control, the improvement comprising said charging subcircuit including in series the capacitor, said fourth resistor between the capacitor and the collector of the PNP transistor, the connection between the capacitor and said fourth resistor occurring at the junction of the capacitor with the emiter of the UJT, said collector-to-emitter portion of the PNP transistor, and a fifth resistor between the emitter terminal of said PNP transistor and the high voltage side of said first Zener regulator, and further comprising said set point control being connected in the voltage divider network in series with a Sensistor and a second Zener regulator, also connected for reverse current flow therethrough, such set point control, Sensistor and second Zener regulator being connected between the base terminal of the PNP transistor and the low voltage side of the first Zener regulator.

2. The improved proportional temperature controller of claim 1 in which said Sensistor element is thermally coupled to said first Zener regulator, whereby a temperature change in the first Zener regulator as a result of either a line voltage fluctuation or a change in ambient temperature causes a corresponding and compensating temperature change in the Sensistor.

3. The improved proportional temperature controller of claim 1 in which said Zener regulator and said Sensistor are located adjacent one another and a thermally conductive metal clip at least partially surrounds and touches each said element and bridges any gap therebetween.

4. The improved proportional temperature controller of claim 1 in which the part of said voltage divider network connected between the base terminal of the PNP transistor and the low voltage side of the first Zener regulator is connected so that the Sensistor has one end connected to said low voltage side of the first Zener regulator and the other end to said second Zener regulator.

5. The proportional temperature controller of claim 1 which includes a sixth resistor in parallel with said thermistor, said sixth resistor being calibrated with the thermistor to provide a more linear resistance-temperature characteristic.

6. A temperature control circuit comprising a rectified but unfiltered AC power supply, a heater connected in series with a silicon controlled rectifier across said power supply, a first Zener diode regulator in series with a first resistor across said power supply, a unijunction transistor having its two bases connected in series with second and third resistors across first and Zener regulator with said second resistor between base one and the ground side of the first Zener regulator and the third resistor between base two and the high voltage side of the regulator, a condenser connected between said ground side of the first Zener regulator and the emitter of said unijunction transistor (UJT), a PNP transistor, a fourth resistor connected between the junction of the condenser with the emitter of the UJT and the collector of said PNP transistor, a fifth resistor between the emitter of the PNP transistor and the high voltage side of the first Zener regulator, a variable resistance subcircuit including a thermistor in parallel with a calibrating resistor connected between said high voltage side of the first Zener regulator and the base of said PNP transistor, said thermistor being located to sense the temperature of the work heated by said heater, and a series circuit between said base of the PNP transistor and the ground side of the Zener regulator comprising a set point control potentiometer, a Sensistor and a second Zener regulator connected for reverse current flow therethrough.

7. The temperature control circuit of claim 6 in which the last named series circuit has the Sensistor connected to the ground side of the first Zener regulator, the set point control connected to the base of the PNP transistor, and the second Zener regulator in the middle.

8. The temperature control circuit of claim 6 which includes a thermal coupling between said sensistor and said first Zener regulator.

9. The temperature control circuit of claim 6 in which said Sensistor and first Zener regulator are located in close physical proximity and are thermo-physically coupled together by a metal band at least partially surrounding and contacting each of them and bridging any gap between them.

References Cited

UNITED STATES PATENTS

| | | | |
|---|---|---|---|
| 3,149,274 | 9/1964 | Horne et al. | 219—505 XR |
| 3,258,579 | 6/1966 | Dills | 219—501 XR |
| 3,275,802 | 9/1966 | Vandivere et al. | 219—505 XR |
| 3,407,286 | 10/1968 | Roby | 219—501 |
| 3,428,785 | 2/1969 | Welch | 219—501 |
| 3,456,096 | 7/1969 | Bilbro | 219—501 |

BERNARD A. GILHEANY, Primary Examiner

F. E. BELL, Assistant Examiner